(12) United States Patent
Nishikawa et al.

(10) Patent No.: US 6,493,035 B1
(45) Date of Patent: Dec. 10, 2002

(54) IMAGE SIGNAL SYNC DETECTOR

(75) Inventors: Hirofumi Nishikawa, Tokyo (JP); Kohtaro Asai, Tokyo (JP); Shinichi Kuroda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 107 days.

(21) Appl. No.: 09/694,814

(22) Filed: Oct. 24, 2000

Related U.S. Application Data (63) Continuation of application No. PCT/JP00/01067, filed on Feb. 24, 2000.

(30) Foreign Application Priority Data

Feb. 24, 1999 (JP) ............................................ 11-047075

(51) Int. Cl.[7] ............................................... H04N 9/475
(52) U.S. Cl. ....................................... 348/518; 348/180
(58) Field of Search ................................. 348/181, 182, 348/183, 180, 189, 192, 193, 614, 461, 463, 464, 465, 466, 467, 473, 474, 500, 501, 512, 518, 177, 178, 519; 324/621, 617, 620, 612; H04N 9/475

(56) References Cited

U.S. PATENT DOCUMENTS

| | | |
|---|---|---|
| 5,574,500 A | 11/1996 | Hamada et al. |
| 6,351,281 B1 * | 2/2002 | Cooper ..................... 348/192 |

FOREIGN PATENT DOCUMENTS

| | | |
|---|---|---|
| JP | 5232628 | 3/1977 |
| JP | 4109781 | 4/1992 |
| JP | 8205156 | 1/1995 |
| JP | 1079946 | 9/1996 |

OTHER PUBLICATIONS

"Development of Digital Compressed Picture Quality Assemsment System—System Configuration–" T. Hamada, et al., 1996 ITE Annual Convention, pp. 336–337.

"Television Image Information Engineering handbook" edited by Institute of Television Engineers of Japan, p. 93, Nov., 30, 1990.

* cited by examiner

*Primary Examiner*—Michael H. Lee
(74) *Attorney, Agent, or Firm*—Birch, Stewart, Kolasch & Birch, LLP

(57) ABSTRACT

A marker inserting part 2 adds a sync signal is added to an input image signal 1 in its available area, then a signal processing part 4 performs signal processing on a yet-to-be processed image signal 3 added with the sync signal, and a marker detecting part 6 detects the sync signal from a processed image signal 5. Based on the sync signal added to the input image signal 1 and the sync signal detected from the processed signal 5, displacement detecting part 7 detects displacements of pixels or lines of the processed image signal 5 and generates displacement information 8 accordingly, and an image sync correcting part 9 corrects displacements of pixels or lines of the processed image signal 5, based on the displacement information 8.

19 Claims, 6 Drawing Sheets

IMAGE SIGNAL SYNC DETECTOR

CROSS-REFERENCE TO THE RELATED APPLICATION

This application is a continuation of International Application No. PCT/JP00/01067, whose International filing date is Feb. 24, 2000, the disclosures of which Application are incorporated by reference herein.

BACKGROUND OF THE INVENTION

1. Field of the Invention

The present invention relates to an image signal sync detector for detecting spatial and temporal displacements of pixels, lines or frames of image signals before and after signal processing such as their digital compression or expansion.

2. Description of the Prior Art

Signal processing such as digital compression and expansion of an image signal is preceded by its conversion to digital form when it is an analog signal, whereas when the processed image signal needs to be provided in analog form, the processing of the image signal is followed by its conversion to analog form. In this course of operation there is a possibility that images of input and output signals are displaced relative to each other.

When the input and output image signals are both digital signals, too, filtering or like signal processing may sometimes cause similar spatial and temporal displacements of the output image from the input signal.

As a solution to this problem, it is customary in the prior art to add sync signals to the image signal outside the available image area. However, such an approach does not sufficiently meet the above-mentioned problem of spatial and temporal displacements of an image by signal processing.

Figure 1:
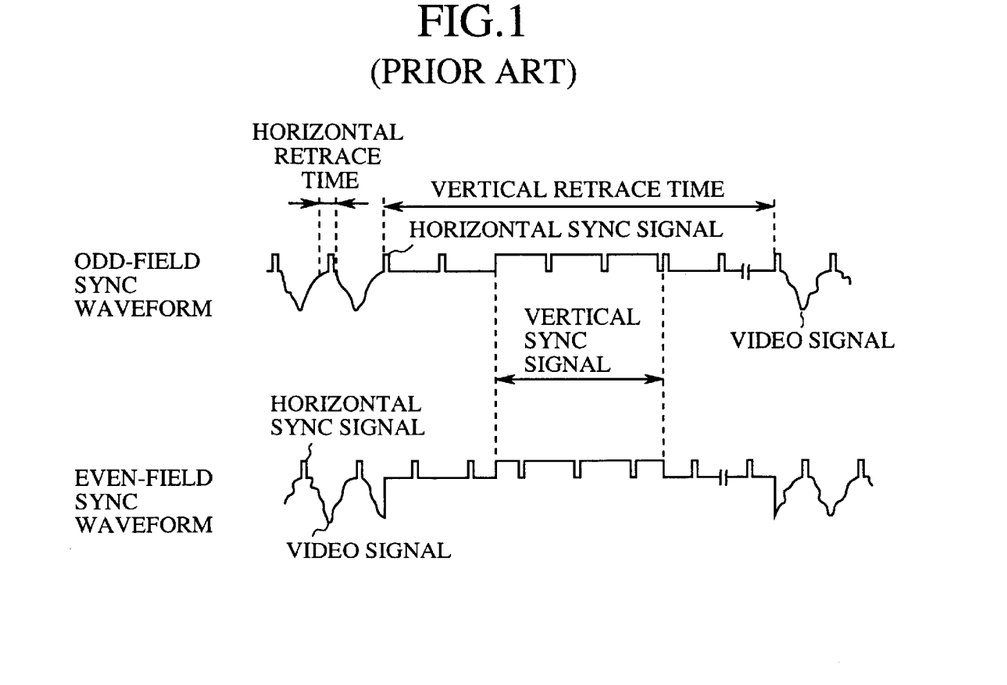
FIG. 1 is a diagram schematically showing examples of waveforms of sync signals for synchronization of image signals in the prior art.

FIG. 1 is a diagram showing, by way of example, waveforms of sync signals for synchronization of image signals in the conventional television signal depicted, for instance, in "Television Image Information Engineering Handbook," edited by Institute of Television Engineers of Japan, page 93, FIG. 3.28, Nov., 30, 1990. The conventional TV signal contains, for image synchronization, horizontal and vertical sync signals inserted in areas different from the video signal area as shown. The insertion of such sync signals in areas outside the available image area does not completely exclude the possibility of spatial and temporal displacements of images between input and output image signals nor does it guarantee that the output video signal is not out of registration with the input signal; furthermore, no means is available for detecting and correcting the displacements of the image.

Incidentally, there is disclosed, for instance, in Japanese Pat. Appln. Laid-Open Gazette No. 79946/98 an image signal sync detector of the type that adds sync signals to the image signal outside the available image area as mentioned above; besides associated descriptions are given in Japanese Pat. Appln. Laid-Open Gazettes Nos. 205156/96 and 109781/92.

Moreover, the recent advanced digital signal processing power has allowed multi-dimensional digital signal processing in the time domain as well as in the space domain, and consequently the displacements of an image before and after signal processing becomes a serious issue. In broadcasting which is particularly likely to involve multi-stage signal processing, spatial and temporal displacements of an image will cause a fatal problem.

With such a conventional method for the synchronization of image signals as described above, displacements of the output image signal relative to the input image signal cannot be detected by the sync signal added to the outside of the available image area of the image signal; hence, the prior art cannot sufficiently deal with the problem of image displacements resulting from image signal processing. The reason for this is that the possibility of the output image signal being displaced relative to the input image signal cannot completely be prevented using the sync signal added to the outside of the available area of the image signal.

SUMMARY OF THE INVENTION

It is therefore an object of the present invention to provide an image signal sync detector which detects spatial and temporal displacements of pixels, lines or frames of image signals resulting from digital signal processing such as coding and decoding of them and, if necessary, corrects the displacements.

In an image signal sync detector according to a first aspect of the present invention: a marker inserting part adds a sync signal to an image signal to be subjected to signal processing (hereinafter referred to as a yet-to-be processed image signal) in its available area; a marker detecting part detects the sync signal from a processed image signal; and a displacement detecting part detects the displacement of the processed image signal, based on the sync signal added in the marker inserting part and said sync signal detected in the marker detecting part.

The above image signal sync detector permits accurate detection of displacements of pixels or lines of the image signal which are caused by such digital signal processing as image signal coding and decoding.

In the image signal sync detector according to the first aspect of the present invention, the marker inserting part adds a signal having edges in one or both of horizontal and vertical directions, as the sync signal, to the yet-to-be processed image signal in its available area.

This permits accurate detection of displacements of an image in one or both of horizontal and vertical directions.

In the image signal sync detector according to the first aspect of the present invention, each frame number is multiplexed in the sync signal which the marker inserting part adds to the yet-to-be processed image signal.

This makes it possible to specify the current frame number by extracting it from the detected sync signal; in the case of a moving picture, its displacements can be detected in time as well.

In the image signal sync detector according to the first aspect of the present invention, the marker inserting part adds plural lines to the yet-to-be processed image signal.

With this scheme, even if the marker detecting part fails to detect the sync signal using one line, it can detect the sync signal using another line, allowing more accurate synchronization control.

In the image signal sync detector according to the first aspect of the present invention, the marker inserting part inserts blank lines before and/or after the line with the sync signal inserted therein.

This permits more accurate extraction of the sync signal from the processed image signal.

In the image signal sync detector according to the first aspect of the present invention, marker inserting part stops the addition of the sync signal to the yet-to-be processed image signal upon detection of the sync signal from the processed image signal in the marker detecting part.

This inhibits the addition of the sync signal to the image signal after the detection of the sync signal in the marker detecting part, permitting the removal of the sync signal from the available image area of the image signal.

In the image signal sync detector according to the first aspect of the present invention, the marker inserting part stops the addition of the sync signal to the yet-to-be processed image signal when displacement information, which is obtained at the time of detecting the sync signal from the processed image signal in the marker detecting part, remains unchanged over plural rounds of detection.

This permits more accurate detection of the sync signal, and provides more accurate information for removing the sync signal from the available area of the image signal.

In the image signal sync detector according to the first aspect of the present invention, the marker detecting part detects the sync signal by performing pattern matching between signals in a candidate area and a sync signal pattern of the same pattern as that of the sync signal.

This allows ease in detecting the sync signal in the marker detecting part.

In the image signal sync detector according to the first aspect of the present invention, the marker detecting part detects the sync signal by performing pattern matching between binarized versions of signals in a candidate area and a binarized version of a sync signal pattern of the same pattern as that of said sync signal.

This permits substantial reduction of the computational complexity for the pattern matching without causing a significant decrease in the accuracy of the sync signal detection.

In an image signal sync detector according to a second aspect of the present invention, an image sync correcting part corrects the displacement of the processed image signal through utilization of the displacement information detected in the displacement detecting part based on the sync signal added in the marker inserting part and the sync signal detected in the marker detecting part.

This permits correction of displacements of pixels or lines of the image signal caused by digital signal processing.

In the image signal sync detector according to the second aspect of the present invention, the marker inserting part adds a signal having edges in one or both of horizontal and vertical directions, as the sync signal, to the yet-to-be processed image signal.

This permits accurate detection of displacements of an image in one or both of horizontal and vertical directions.

In the image signal sync detector according to the second aspect of the present invention, each frame number is multiplexed in the sync signal which the marker inserting part adds to the yet-to-be processed image signal.

This makes it possible to specify the current frame number by extracting it from the detected sync signal; in the case of a moving picture, its displacements can be detected in the time domain as well.

In the image signal sync detector according to the second aspect of the present invention, the marker inserting part adds plural identical sync signals to the yet-to-be processed image signal in its available area.

With this scheme, even if the marker detecting part fails to detect the sync signal using one line, it can detect the sync signal using another line, allowing more accurate synchronization control.

In the image signal sync detector according to the second aspect of the present invention, the marker inserting part inserts blank lines before and/or after the line with the sync signal inserted therein.

This permits more accurate extraction of the sync signal from the processed image signal.

In the image signal sync detector according to the second aspect of the present invention, the marker inserting part stops the addition of the sync signal to the yet-to-be processed image signal upon detection of the sync signal from the processed image signal in the marker detecting part.

This inhibits the addition of the sync signal to the image signal after the detection of the sync signal in the marker detecting part, permitting the removal of the sync signal from the available image area of the image signal.

In the image signal sync detector according to the second aspect of the present invention, the marker inserting part stops the addition of the sync signal to the yet-to-be processed image signal when displacement information, which is obtained at the time of detecting the sync signal from the processed image signal in the marker detecting part, remains unchanged over plural rounds of detection.

This permits more accurate detection of the sync signal, and provides more accurate information for removing the sync signal from the available area of the image signal.

In the image signal sync detector according to the second aspect of the present invention, the marker detecting part detects the sync signal from the processed image signal by performing pattern matching between signals in a candidate area and a sync signal pattern of the same pattern as that of the sync signal.

This allows ease in detecting the sync signal in the marker detecting part.

In the image signal sync detector according to the second aspect of the present invention, the marker detecting part detects the sync signal from the processed image signal by performing pattern matching between binarized versions of signals in a candidate area and a binarized version of a sync signal pattern of the same pattern as that of the sync signal.

This permits substantial reduction of the computational complexity for the pattern matching without causing a significant decrease in the accuracy of the sync signal detection.

BRIEF DESCRIPTION OF THE DRAWINGS

Other objects, features and advantages of the present invention will become more apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiment of the present invention.

EMBODIMENT 1

Figure 2:
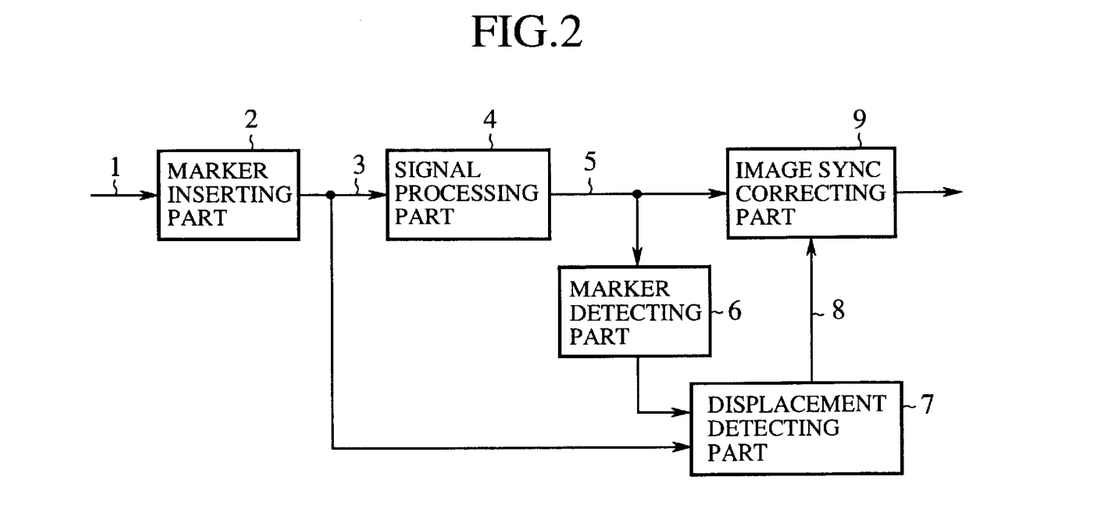
FIG. 2 is a block diagram illustrating the construction of an image signal sync detector according to a first embodiment of the present invention.

FIG. 2 illustrates in block form the construction of an image signal sync detector according to a first embodiment (Embodiment 1) of the present invention. Reference numeral 1 denotes an input image signal which is to be subjected to signal processing; 2 denotes a marker inserting part which adds a sync signal to the input image signal 1; 3 denotes a yet-to-be processed image signal added with the sync signal (an image signal added with a sync signal); 4 denotes a signal processing part which performs predetermined signal processing on the yet-to-be processed image signal 3; 5 denotes a processed image signal subjected to predetermined signal processing in the signal processing part 4 (a processed signal); 6 denotes a marker detecting part which detects the sync signal added to the processed image signal 5; 7 denotes a displacement detecting part which detects the displacement (spatial and/or temporal) of the processed image signal 5 with the yet-to-be processed image signal 3 from the sync signal added in the marker inserting part 2 and the sync signal detected in the marker detecting part 6; 8 denotes displacement information detected by the displacement detecting part 7; and 9 denotes an image synchronization correcting part which corrects the out-of-sync of the processed image signal 5 based on the displacement information 8.

Figure 3:
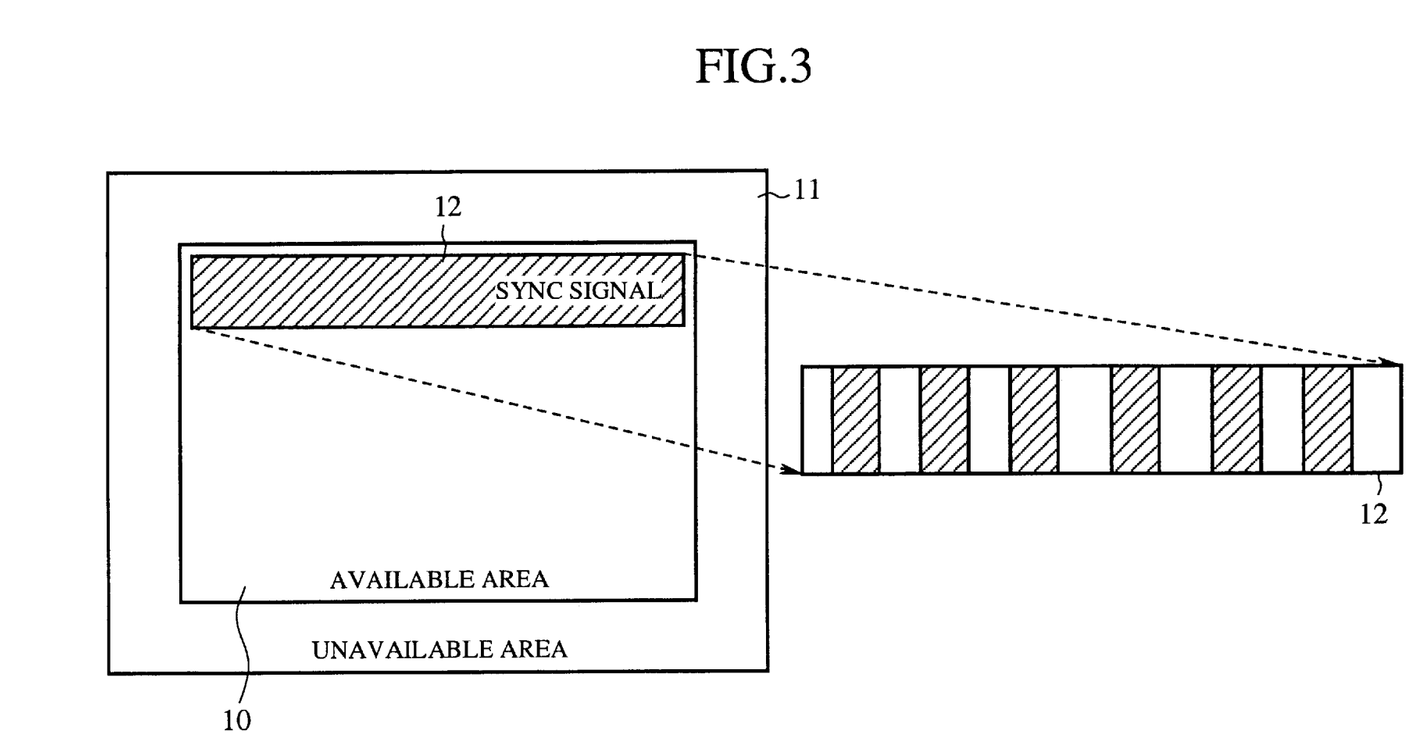
FIG. 3 is a diagram schematically showing an example of the insertion of a sync signal in the first embodiment of the present invention.

FIG. 3 is a diagram schematically showing, by way of example, how to add the sync signal to the input image signal 1 by the marker inserting part 2. Reference numeral 10 denotes an available area of the input image signal 1 to be processed in the signal processing part 4; 11 denotes an unavailable area of the input image signal 1 which is not to be processed in the signal processing part 4; and 12 denotes a sync signal composed of plural lines which is inserted by the marker inserting part 2 in the upper part of the available area 10 of the input image signal 1.

Figure 4:
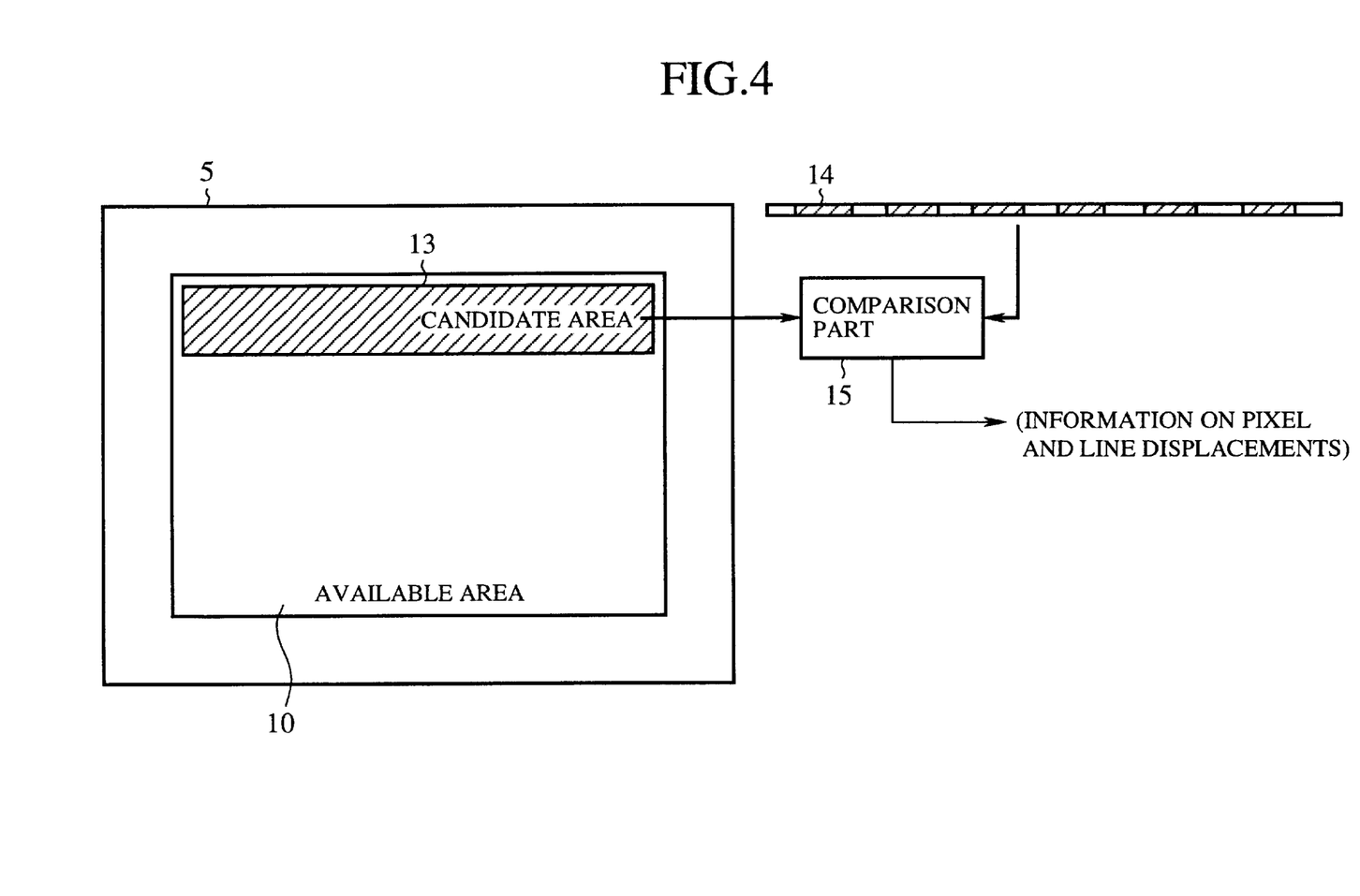
FIG. 4 is a diagram schematically showing an example of the detection of the sync signal in the first embodiment of the present invention.

FIG. 4 is a diagram schematically showing, by way of example, how to detect the sync signal by the marker detecting part 6. Reference numeral 13 denotes a part of the available area 10 of the processed image signal 5 which is considered as a candidate area where the marker inserting part 2 has inserted the sync signal 12; 14 denotes a sync signal pattern of the same pattern as that of the sync signal 12 added by the marker inserting part 2; and 15 denotes a comparison part which obtains information about displacements of pixels or lines by searching the candidate area 13 through pattern matching for that one of sync signal patterns in the candidate area 13 which is the most approximate to the sync signal pattern 14.

Now, the operation of this embodiment will be described below.

The input image signal 1 is applied to the marker inserting part 2, wherein it is added in its available area with a sync signal. The yet-to-be processed image signal 3 added with the sync signal is fed to the signal processing part 4, wherein it is subjected to image coding or simile signal processing. The processed image signal 5 thus subjected to predetermined signal processing is provided to the marker detecting part 6, which detects the sync signal from the processed image signal 5 and provides the sync signal to the displacement detecting part 7. The displacement detecting part 7 is also being supplied with the sync signal added to the input image signal 1 in the marker inserting part 2, and detects displacements of an image or its lines between the yet-to-be processed signal 3 and the processed signal 5, based on the sync signal added in the marker inserting part 2 and the sync signal detected in the marker detecting part 6, and creates the displacement information 8 accordingly.

As depicted in FIG. 3, the input image signal 1 is divided into the available area 10 to be subjected to signal processing in the signal processing part 4 and the unavailable area 11 that is not subjected to signal processing. The maker inserting part 2 inserts the sync signal 12 in the effective area 10 at known pixel and line positions. In the image signal 5 processed in the signal processing part, the sync signal 12 is somewhat changed by the signal processing and is inserted in the candidate area 13 of the available area 10 as shown in FIG. 4. In the marker detecting part 6 the sync signal 12 inserted in the processed signal 5 is detected from the candidate area 13.

Now, a detailed description will be given of the detection of the sync signal 12 in the marker detecting part 6. Upon input of the processed signal 5 in the marker detecting part 6, the candidate area 13 (which is considered as an area where the marker inserting part 2 inserted the sync signal 12) is extracted from the image signal. This is followed by preparing the sync signal pattern 14 of the same pattern as the sync signal inserted in the marker inserting part 2. At this time, it is known in advance what kind of sync signal was inserted in the processed signal 5 in the marker inserting part 2. Incidentally, there are two cases where information about the sync signal is sent from the marker inserting part 2 to the marker detecting part 6 for each image signal and where such information is provided in advance. Next, in the comparison part 15 the sync signal is detected by searching the extracted candidate area 13 through pattern matching for that one of sync signal patterns therein which is the most approximate to the sync signal pattern 14. The deviation or mismatch obtained by the pattern matching is used as the information about displacements of pixel or lines.

The displacement detecting part 7 computes the displacement information 8 from the relationships between the pixel and line positions of the sync signal 12 derived in the course of detection of the sync signal in the marker detecting part 6 and the pixel and line positions of the sync signal 12 inserted in the marker inserting part 2.

Incidentally, the image signal sync detector according to this embodiment is equipped with the image sync correcting part 9, which is supplied with the displacement information 8 computed in the displacement detecting part 7. The image sync correcting part 9 is also supplied with the processed image signal 5 from the signal processing part 4, and corrects the displacement of the processed image signal 5, based on the displacement information 8. The image sync correcting part 9 need not always be provided, in which case the displacement information 8 may be used for some other purpose.

As described above, according to this embodiment, the displacement of an image can be computed based on the sync signal inserted in the available area of the input image signal prior to its signal processing and the sync signal detected after the signal processing. With the image signal sync detector of this embodiment, displacements of pixels or lines of the image, caused by digital signal processing such as coding and decoding of the image signal, can be detected more accurately than in the case of the conventional detector of the type inserting a sync signal in the outside of the available area of the processed signal. And, if necessary, the information on the displacements of the pixels and lines thus detected can be used to correct the displacements.

EMBODIMENT 2

Figure 5:
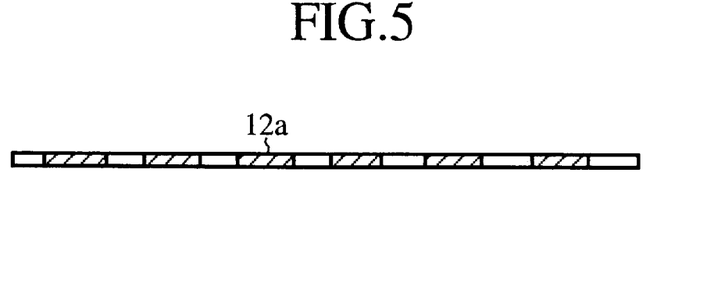
FIG. 5 is a diagram schematically showing an example of the insertion of a sync signal in a second embodiment of the present invention.

An image signal sync detector according to a second embodiment (Embodiment 2) of the present invention is identical in construction with the sync detector of Embodiment 1 depicted in FIG. 2; hence no description will be repeated in respect of the configuration of this embodiment. FIG. 5 is a diagram showing an example of a sync signal that is inserted in the input image signal 1 in the marker inserting part 2 of the image signal sync detector of the second embodiment. Reference numeral 12a denotes the sync signal, which is a horizontally discontinued broken-line-like signal formed by a single line and has edges in both horizontal and vertical directions. The edges herein mentioned are breaks (points of change) of the signal.

As mentioned above, according to Embodiment 2, the sync signal 12a is a single-line signal that has edges in the horizontal and vertical directions, and hence it permits accurate detection and correction of horizontal (pixel) and vertical (line) displacements of the image.

While in the above the sync signal 12a has been described to have edges in both of the horizontal and vertical directions, it may also have edges in only one of the horizontal and vertical directions; the horizontal edges allows detection and correction of horizontal displacements of the image, whereas the vertical edges enables detection and correction of vertical displacements of the image.

EMBODIMENT 3

Figure 6:
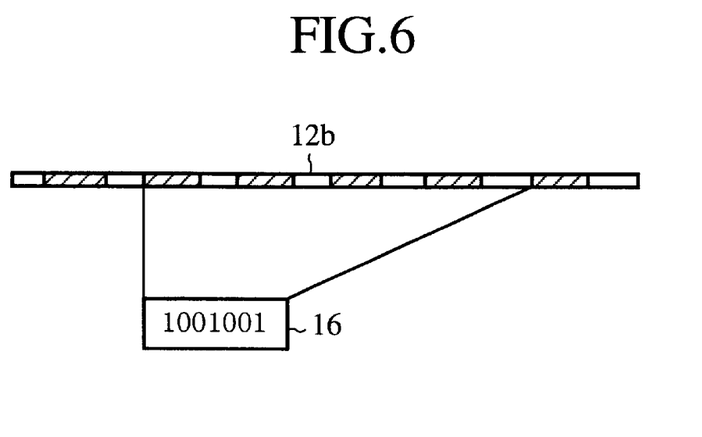
FIG. 6 is a diagram schematically showing an example of the insertion of the sync signal in a third embodiment of the present invention.

An image signal sync detector according to a third embodiment (Embodiment 3) of the present invention is identical in construction with the sync detector of Embodiment 1 depicted in FIG. 2; hence no description will be repeated in respect of the configuration of this embodiment. FIG. 6 is a diagram showing an example of a sync signal that is inserted in the input image signal 1 in the marker inserting part 2 of the image signal sync detector of the third embodiment. Reference numeral 12b denotes the sync signal, which differs from the sync signal 12 in Embodiment 1 in that a numeric value is multiplexed in the line of the sync signal and is made to correspond to the frame number of a moving image in the time domain. Reference numeral 16 denotes the above-mentioned frame number to which the multiplexed numeric value is made to correspond.

As referred to above, according to Embodiment 3, a numeric value is multiplexed in the line of the sync signal 12b and is made to correspond to the frame number 16 of the moving image in the time domain. By extracting the numeric value corresponding to the frame number 16 from the sync signal 12b detected in the marker detecting part 6, the current frame number of the moving image can be specified, by which it is possible to detect and correct a displacement of the image in the time domain (a frame displacement) as well.

EMBODIMENT 4

Figure 7:
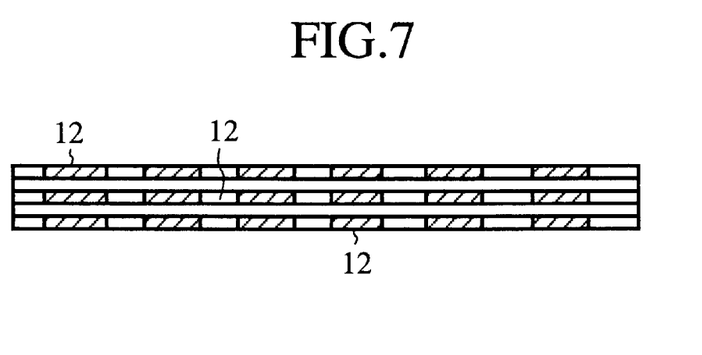
FIG. 7 is a diagram schematically showing an example of the insertion of a sync signal in a fourth embodiment of the present invention.

An image signal sync detector according to a fourth embodiment (Embodiment 4) of the present invention is identical in construction with the sync detector of Embodiment 1 depicted in FIG. 2; hence no description will be repeated in respect of the configuration of this embodiment. FIG. 7 is a diagram showing an example of a sync signal that is inserted in the input image signal 1 in the marker inserting part 2 of the image signal sync detector of the fourth embodiment. Reference numeral 12 denotes the sync signal added to each of plural lines. This embodiment differs from Embodiment 1 in that the same sync signal 12 is added to each of plural lines as mentioned above.

According to Embodiment 4, multiplexed versions of the same sync signal 12 are used for the plural lines; hence, even if the marker detecting part 6 fails to detect the sync signal 12 in a certain line, it can detect the sync signal 12 using a different line—this permits synchronization control with increased accuracy.

EMBODIMENT 5

Figure 8:
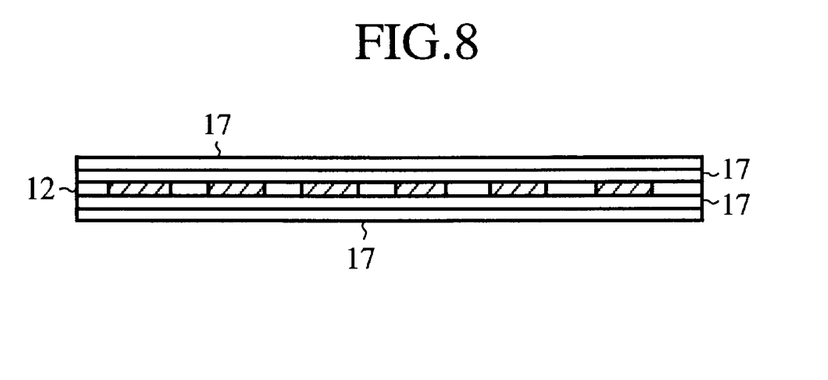
FIG. 8 is a diagram schematically showing an example of the insertion of the sync signal in a fifth embodiment of the present invention.

An image signal sync detector according to a fifth embodiment (Embodiment 5) of the present invention is identical in construction with the sync detector of Embodiment 1 depicted in FIG. 2; hence no description will be repeated in respect of the configuration of this embodiment. FIG. 8 is a diagram showing an example of a sync signal that is inserted in the input image signal 1 in the marker inserting part 2 of the image signal sync detector of the fifth embodiment. Reference numeral 12 denotes the sync signal, and 17 denotes blank lines inserted before and after the line added with the sync signal 12. The blank lines 17 are each composed of fixed values such as black and white. This embodiment differs from Embodiment 1 in that the line added with the sync signal 12 is flanked by two pairs of blank lines 17.

As described above, according to Embodiment 5, the insertion of the blank lines 17 before and after the line containing the sync signal 12 further emphasizes the feature that the sync signal has edges in the vertical direction as referred to previously with respect to Embodiment 2. With the blank lines 17 inserted before and after the sync signal 12, it is possible to extract the sync signal 12 from the processed signal 5 with higher accuracy in the marker detecting part 6.

EMBODIMENT 6

Figure 9:
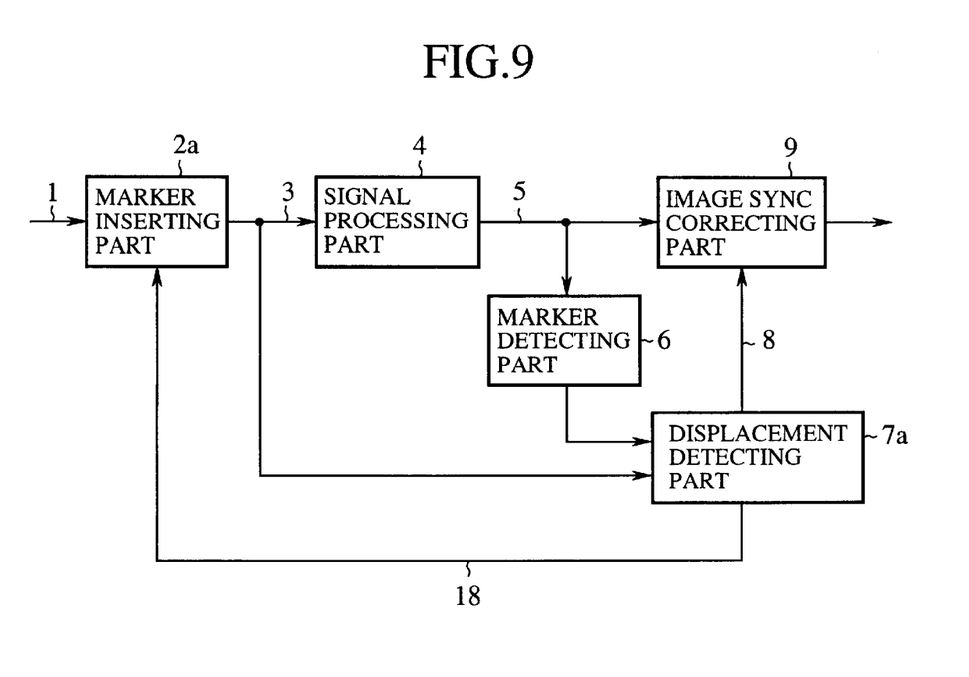
FIG. 9 is a block diagram illustrating the construction of an image signal sync detector according to a six embodiment of the present invention.

While the above embodiments have been described to add the sync signal to the input image signal 1 in the marker inserting part 2, provision may also be made for stopping the addition of the sync signal in the marker inserting part 2 by a sync-signal detection signal. FIG. 9 illustrates in block form a sync signal detector equipped with such a function according to a sixth embodiment (Embodiment 6) of the present invention. The parts corresponding to those in FIG. 2 are identified by the same reference numerals, and no description will be repeated.

In FIG. 9, reference numeral 2a denotes a marker inserting part that inserts a sync signal in the available area of the input image signal 1 which is an image signal that is to be subjected to signal processing. The marker inserting part 2a, however, differs from the counterpart 2 in FIG. 2 in that the former possesses the function of stopping the insertion of the sync signal in the input image signal 1 upon receipt of a sync-signal detection signal. Reference numeral 7a denotes a displacement detecting part which detects the displacement of the processed image signal 5 with the yet-to-be processed image signal 3 from the sync signal added in the marker inserting part 2a and the sync signal detected in the marker detecting part 6. But the displacement detecting part 7a differs from the counterpart 7 in FIG. 2 in that the former possesses the function of sending a sync-signal detect signal to the marker inserting part 2a upon detection of the sync signal from the processed image signal 5 in the marker detecting part 5. Reference numeral 18 denotes the sync-signal detect signal that is sent from the displacement detecting part 7a to the marker inserting part 2a.

Next, the operation of this embodiment will be described below.

When supplied with the input image signal 1, the marker inserting part 2a inserts a sync signal in the available area of the input image signal. The signal processing part 4 performs image coding or similar processing on the yet-to-be processed image signal 3 added with the sync signal. The marker detecting part 6 detects the sync signal from the processed signal 5, and provides the detected sync signal to the displacement detecting part 7a. The displacement detecting part 7a detects displacements of pixels or lines of the processed image signal 5, based on the sync signal added in the marker inserting part 2a and the sync signal detected in the marker detecting part 6, and computes the displacement information 8 accordingly. Upon receipt of the sync signal detected in the marker detecting part 6, the displacement detecting part 7a generates the sync-signal detect signal 18 indicating the detection of the sync signal in the marker detecting part 6, and applies the signal 18 to the marker inserting part 2a. The marker inserting part 2a responds to the sync-signal detect signal 18 to stop the insertion of the sync signal in the input image signal 1.

As described above, according to Embodiment 6, no sync signal is inserted in the input image 1 after the detection of the sync signal in the marker detecting part 6—this permits removal of the sync signal in the available area of the image signal.

EMBODIMENT 7

Figure 10:
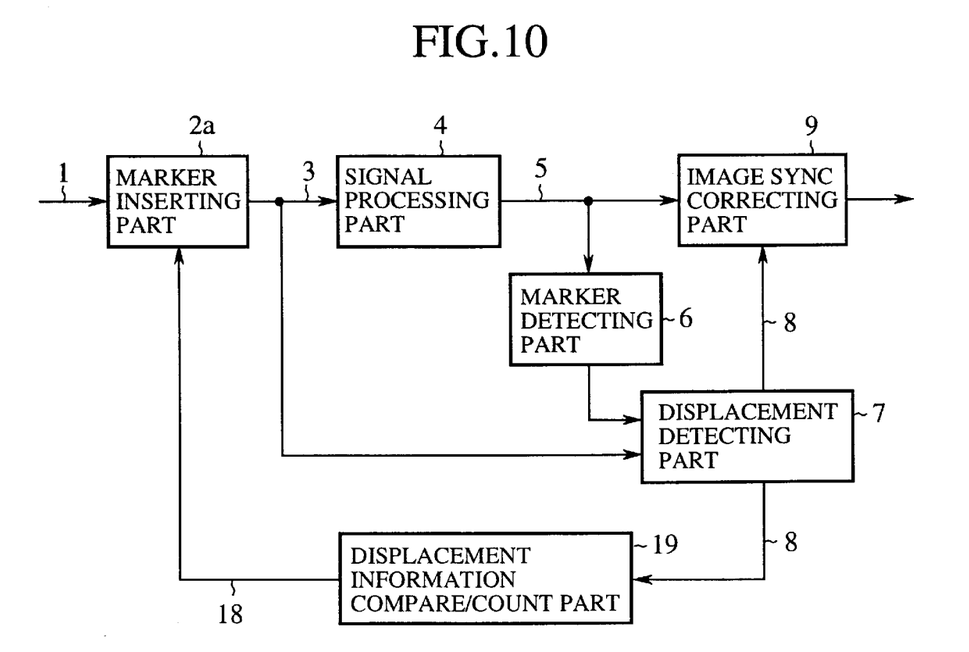
FIG. 10 is a block diagram illustrating the construction of an image signal sync detector according to a seventh embodiment of the present invention.

While Embodiment 6 has been described to stop the addition of the sync signal in the marker inserting part 2 when the sync signal is detected once, the insertion of the sync signal may also be stopped when the same displacement information 8 is detected over two or more rounds of sync signal detection. FIG. 10 illustrates in block form an image signal sync detector equipped with such a function according to a seventh embodiment (Embodiment 7) of the present invention. The parts corresponding to those in FIG. 9 are identified by the same reference numerals and no description will be repeated.

In FIG. 10, reference numeral 19 denotes a displacement information compare/count part which compares, over a predetermined number of rounds of sync signal detection, the displacement information 8 that is fed from the out-of-sync detecting part 7 upon detection of the sync signal from the processed signal 5 in the marker detecting part 6 and, if the displacement information 8 compared over the predetermined number of rounds remains unchanged, generates and provides the sync-signal detect signal 18 to the marker inserting part 2a.

Next, the operation of this embodiment will be described below.

As is the case with Embodiment 6, the yet-to-be processed image signal 3 added with the sync signal in the marker inserting part 2 is subjected to signal processing in the signal processing part 4, from which the processed image signal 5 is provided. The processed image signal 5 is sent to the marker detecting part 6 for the detection of the sync signal. Based on the sync signal added in the marker inserting part 2 and the sync signal detected in the marker detecting part 6, the displacement detecting part 7 detects displacements of pixels or lines of the processed image signal 5, and computes and sends the displacement information 8 to the image sync correcting part 9 and the displacement information compare/count part 19.

The displacement information compare/count part 19 compares the current displacement information 8 with the previous displacement information 8, and increments its internal counter by one or clears it to zero, depending on whether they match or not. The displacement information compare/count part 19 repeats the comparison, and when a predetermined count value of the internal counter is reached, that is, when the displacement information 8 from the displacement detecting part 8 remains unchanged over a predetermined number of rounds of comparison, the displacement information compare/count part generates and applies the sync-signal detect signal 18 to the marker inserting part 2a. When supplied with the sync-signal detect signal 18, the marker inserting part 2a stops from insertion of the sync signal in the input image signal 1.

As described above, according to Embodiment 7, when the displacement information 8 remains unchanged over plural rounds of comparison after the detection of the sync signal in the marker detecting part 6, the insertion of the sync signal in the input image signal 1 is stopped. This permits more accurate detection of the sync signal than in the case of Embodiment 6, and provides more accurate information for removing the sync signal from the available area of the image signal.

EMBODIMENT 8

Figure 11:
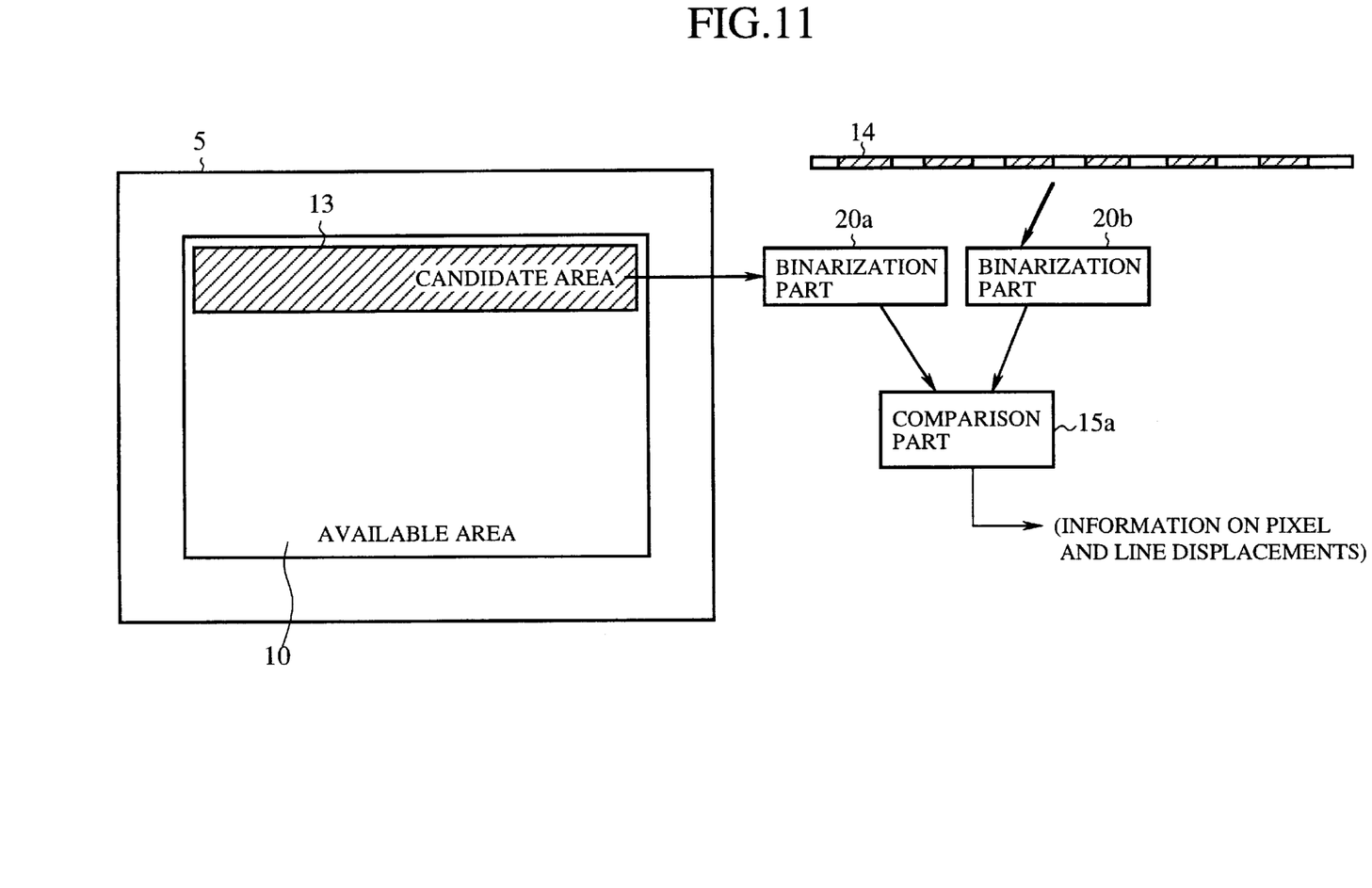
FIG. 11 is a diagram schematically showing an example of the detection of a sync signal in an eighth embodiment of the present invention.

An image signal sync detector according to an eighth embodiment (Embodiment 8) of the present invention is identical in construction with the sync detector of Embodiment 1 depicted in FIG. 2; hence no description will be repeated in respect of the configuration of this embodiment. FIG. 11 is a diagram showing an example of the detection of a sync signal in the marker detecting part 6 of the image signal sync detector of the eighth embodiment. The parts corresponding to those in FIG. 4 are identified by the same reference numerals and no description will be repeated. In FIG. 11, reference numeral 20a denotes a binarization part, which extracts a signal from the candidate area 13 in the available area 10 of the processed image signal 5 and binarizes the extracted signal; and 20b denotes a binarization part, which binarizes the sync signal pattern 14 of the same pattern as that of the sync signal added in the marker inserting part 2. Reference numeral 15a denotes a comparison part which performs pattern matching between the signal binarized in the binarization part 20a or 20b and the sync signal pattern 14 to search the candidate area 13 for the pattern which is the most approximate to the sync signal pattern 14, thereby obtaining information about displacements of pixels or lines of the image signal.

Now, the operation of this embodiment will be described below.

As is the case with Embodiment 1, the first step is to extract from the processed image signal 5 the candidate area 13 where the marker inserting part 2 is considered to have inserted the sync signal. This is followed by preparing the sync signal pattern 14 of the same pattern as that of the sync signal inserted by the marker inserting part 2 in the input image signal 1. In this case, it is known in advance what kind of sync signal was inserted by the marker inserting part 2. Next, signals in the candidate area 13 are binarized in the binarization part 20a, and at the same time the sync signal pattern 14 is also binarized in the binarization part 20b. In the comparison part 15a pattern matching is performed between the binarized signals of the candidate area 13 and the similarly binarized sync signal patterns 14 to search for that one of the bianrized candidate signals which is the most approximate to the sync signal pattern 14, thereby detecting the sync signal inserted in the input image signal 1. The deviation thus obtained by the pattern matching becomes information about the displacements of pixels and lines of the image signal.

As described above, according to Embodiment 8, the signals in the candidate area 13 and the sync signal pattern for comparison therewith are once binarized prior to the pattern matching in the comparison part 15a. The binarization permits substantial reduction of the computational complexity necessary for the pattern matching without causing a significant decrease in the accuracy of detection.

Although in the above embodiments plural functions have been described individually, it is needless to say that the functions can be combined in one image signal sync detector. Further, the above embodiments have been described to perform signal processing of the yet-to-be image signal 3 in the signal processing part 4, but in practice, the signal processing part 4 is placed outside the image signal sync detector and is not regarded as a constituent of the of the device.

EFFECT OF THE INVENTION

As described above, the image signal sync detector according to the present invention is suitable for use in detecting and, if necessary, correcting displacements of pixels, lines and frames of image signals caused by digital signal processing such as image coding and decoding.

What is claimed is:

1. An image signal sync detector comprising:
   a marker inserting part which adds a sync signal to a to be processed image signal in its active area;
   a marker detecting part which detects said sync signal from a processed image signal; and
   a displacement detecting part which detects spatial displacement of pixels or lines of said processed image signal, based on said sync signal added in said marker inserting part and said sync signal detected in said marker detecting part.

2. The image signal sync detector of claim 1, wherein said marker inserting part adds a signal having edges in one or both of horizontal and vertical directions, as said sync signal, to said to be processed image signal in its active area.

3. The image signal sync detector of claim 1; wherein said marker inserting part adds a signal having a multiplexed numeric value corresponding to a frame number, as said sync signal, to said to be processed image signal in its active area.

4. The image signal sync detector of claim 1, wherein said marker inserting part adds plural identical sync signals to said to be processed image signal in its active area.

5. The image signal sync detector of claim 1, wherein said marker inserting part inserts a blank line before and after a one-line sync signal added to the active area of said to be processed image signal.

6. The image signal sync detector of claim 1, wherein said marker inserting part stops the addition of said sync signal to said to be processed image signal upon detection of said sync signal from said processed image signal in said marker detecting part.

7. The image signal sync detector of claim 1, wherein said marker inserting part stops the addition of said sync signal to said to be processed image signal when displacement information, which is obtained at the time of detecting said sync signal from said processed image signal in said marker detecting part, remains unchanged over plural rounds of detection.

8. The image signal sync detector of claim 1, wherein said marker detecting part detects said sync signal from said processed image signal by performing pattern matching between signals in a candidate area where said sync signal concerned is considered to have been added and a sync signal pattern of the same pattern as that of said sync signal.

9. The image signal sync detector of claim 1, wherein said marker detecting part detects said sync signal from said processed image signal by performing pattern matching between binarized versions of signals in a candidate area where said sync signal concerned is considered to have been added and a binarized version of a sync signal pattern of the same pattern as that of said sync signal.

10. An image signal sync detector comprising:
    a marker inserting part which adds a sync signal to a to be processed image signal in its active area;
    a marker detecting part which detects said sync signal from a processed image signal;
    a displacement detecting part which detects spatial displacement of pixels or lines of said processed image signal, based on said sync signal added in said marker inserting part and said sync signal detected in said marker detecting part; and
    an image sync correcting part which corrects said displacement of said processed image signal, based on said displacement information detected in said displacement detecting part.

11. The image signal sync detector of claim 10, wherein said marker inserting part adds a signal having edges in one or both of horizontal and vertical directions, as said sync signal, to said to be processed image signal in its active area.

12. The image signal sync detector of claim 10, wherein said marker inserting part adds a signal having a multiplexed numeric value corresponding to a frame number, as said sync signal, to said to be processed image signal in its active area.

13. The image signal sync detector of claim 10, wherein said marker inserting part adds plural identical sync signals to said to be processed image signal in its active area.

14. The image signal sync detector of claim 10, wherein said marker inserting part inserts a blank line before and after a one-line sync signal added to the available area of said to be processed image signal.

15. The image signal sync detector of claim 10, wherein said marker inserting part stops the addition of said sync signal to said to be processed image signal upon detection of said sync signal from said processed image signal in said marker detecting part.

16. The image signal sync detector of claim 10, wherein said marker inserting part stops the addition of said sync signal to said to be processed image signal when displacement information, which is obtained at the time of detecting said sync signal from said processed image signal in said marker detecting part, remains unchanged over plural rounds of detection.

17. The image signal sync detector of claim 10, wherein said marker detecting part detects said sync signal from said processed image signal by performing pattern matching between signals in a candidate area where said sync signal concerned is considered to have been added and a sync signal pattern of the same pattern as that of said sync signal.

18. The image signal sync detector of claim 10, wherein said marker detecting part detects said sync signal from said processed image signal by performing pattern matching between binarized versions of signals in a candidate area where said sync signal concerned is considered to have been added and a binarized version of a sync signal pattern of the same pattern as that of said sync signal.

19. A method for detecting a sync of an image signal comprising:

inserting a sync signal to said image signal in its active area and prior to processing;

detecting said sync signal from a processed image signal;

determining spatial displacement of pixels or lines of said processed image signal, based on said sync signal inserted in said image signal before processing and said sync signal detected after processing; and correcting displacement of said processed image signal based on the determined temporal and spatial displacement.

* * * * *